Figure 1:
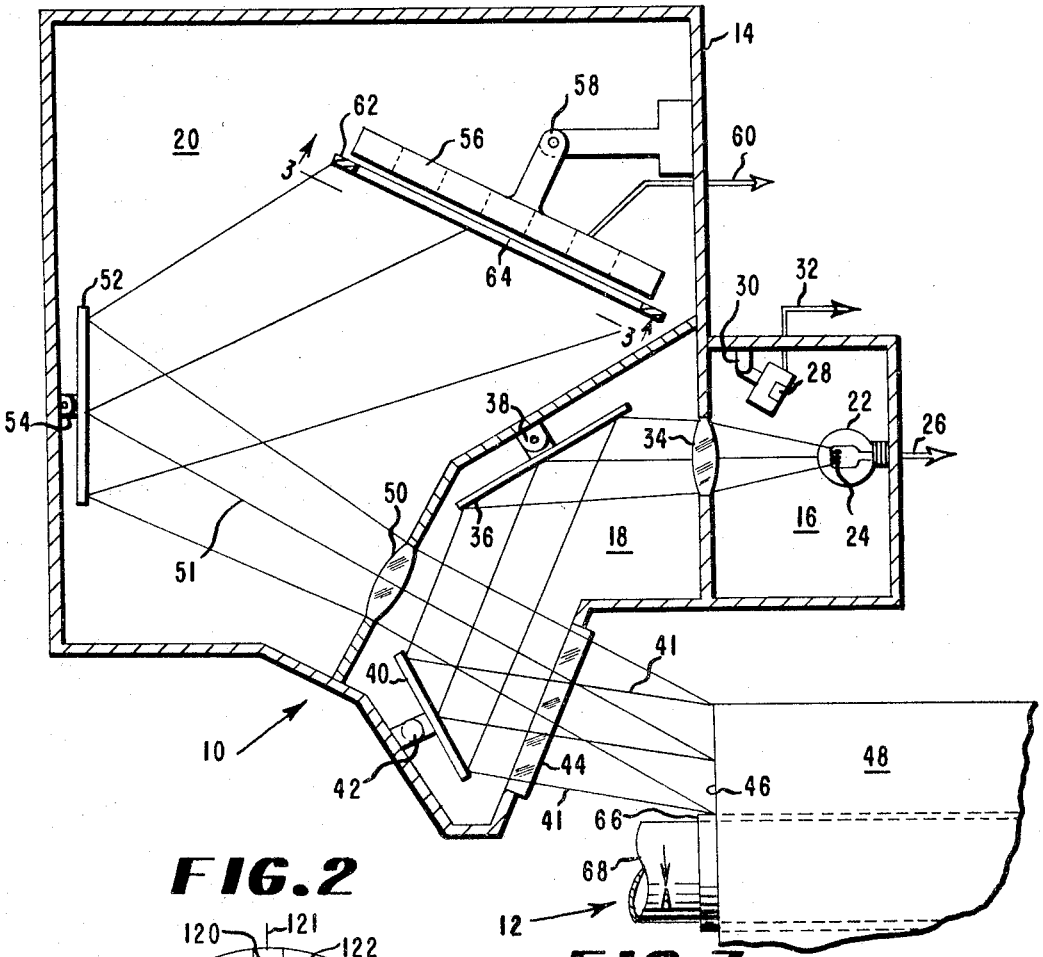
Figure 2:
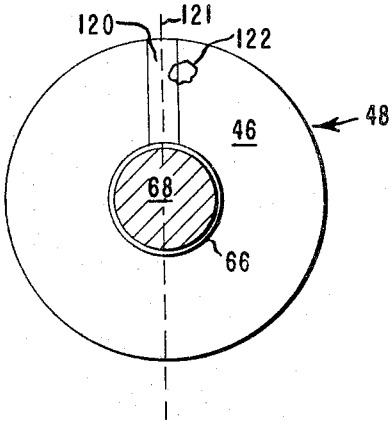
Figure 3:
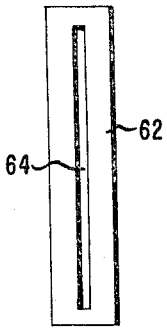
Figure 4:
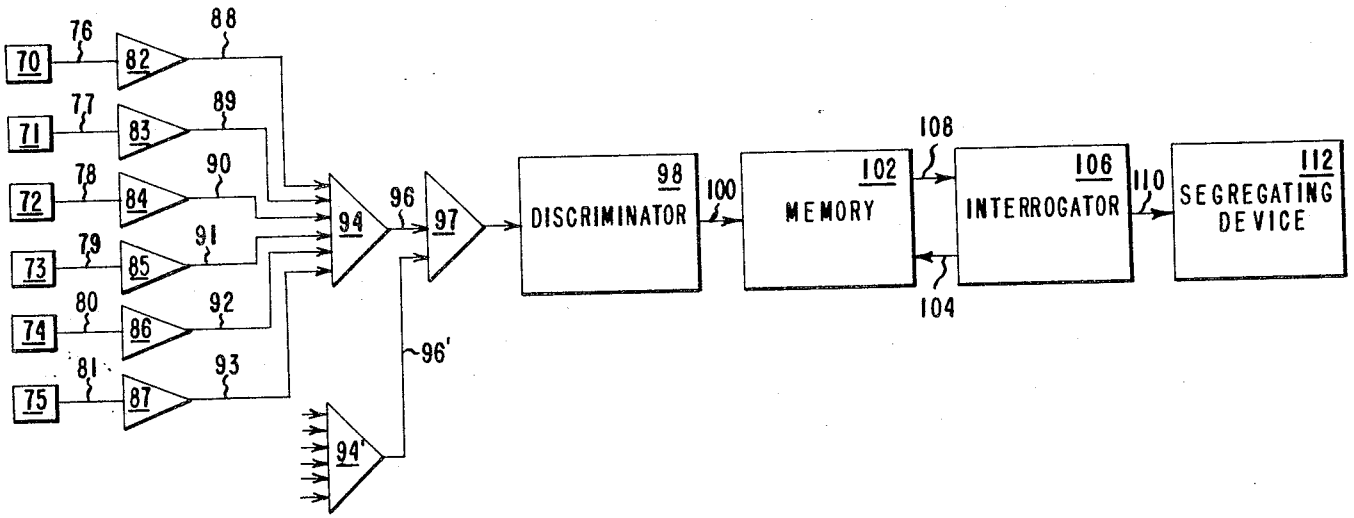

T861028

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 15, 1969

861 O.G. 704

706,017

APPARATUS FOR DETECTING DISCOLORATION IN A CYLINDRICAL YARN PACKAGE BY OBSERVING CHANGES IN REFLECTIVITY ON THE ENDS OF THE PACKAGE

Gerald Irving Buckson, Newark, and John Albert Masino and Stanley Victor Williams, Wilmington, Del., assignors to E. I. du Pont de Nemours and Company, Wilmington, Del., a corporation of Delaware

Filed Feb. 16, 1968. Published Apr. 15, 1969
Class 356—196
2 Sheets Drawing. 9 Pages Specification

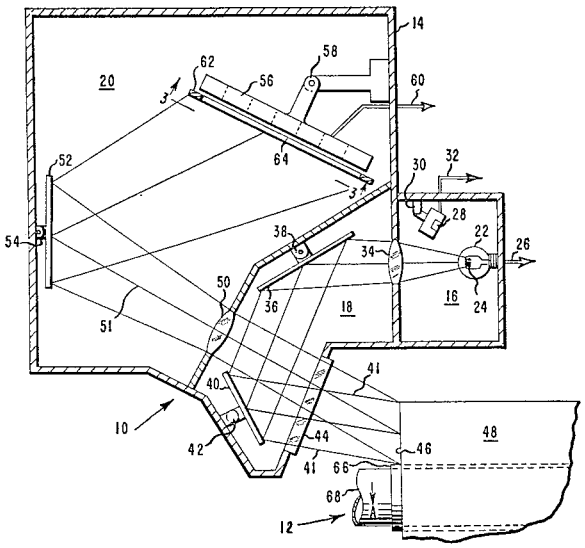

An apparatus for detecting discoloration on the end surface of a rotating cylindrical yarn package 48 wherein a ribbon of light 41 is projected onto the end surface 46. The illuminated portion of the end surface is viewed by a plurality of photoresponsive means 56 through an aperture 64. The electrical output signals from the photoresponsive means are electronically processed and compared to determine if the signals fall within selected limits to indicate off-standard discoloration of the package end surface. A duplicate apparatus arrangement is provided for simultaneously inspecting both end surfaces of the package.

April 15, 1969 G. I. BUCKSON ETAL DEF. PUB.

APPARATUS FOR DETECTING DISCOLORATION IN A CYLINDRICAL YARN PACKAGE BY OBSERVING CHANGES IN REFLECTIVITY ON THE ENDS OF THE PACKAGE

SN - 706017 T861028

Filed Feb. 16, 1968 Sheet 1 of 2

INVENTORS
GERALD IRVING BUCKSON
JOHN ALBERT MASINO
STANLEY VICTOR WILLIAMS

BY Howard P. West Jr.
ATTORNEY

April 15, 1969 G. I. BUCKSON ETAL DEF. PUB.

APPARATUS FOR DETECTING DISCOLORATION IN A CYLINDRICAL YARN PACKAGE BY OBSERVING CHANGES IN REFLECTIVITY ON THE ENDS OF THE PACKAGE SN - 706017 T861028

Filed Feb. 16, 1968 Sheet 2 of 2

INVENTORS
GERALD IRVING BUCKSON
JOHN ALBERT MASINO
STANLEY VICTOR WILLIAMS

BY Howard P. West Jr.
ATTORNEY